US011164010B2

(12) United States Patent
Turk

(10) Patent No.: US 11,164,010 B2
(45) Date of Patent: Nov. 2, 2021

(54) SYSTEM FOR ACTIVATING A SECURITY MODE IN A VEHICLE

(71) Applicants: DENSO International America, Inc., Southfield, MI (US); Denso Corporation, Kariya (JP)

(72) Inventor: Jeffrey Turk, South Lyon, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 11 days.

(21) Appl. No.: 16/819,724

(22) Filed: Mar. 16, 2020

(65) Prior Publication Data

US 2021/0287017 A1 Sep. 16, 2021

(51) Int. Cl.
*G06K 9/32* (2006.01)
*G06K 9/00* (2006.01)
*G01C 21/34* (2006.01)
*G07C 9/00* (2020.01)

(52) U.S. Cl.
CPC ..... *G06K 9/00791* (2013.01); *G01C 21/3476* (2013.01); *G06K 9/00362* (2013.01); *G06K 9/3233* (2013.01); *G07C 9/00182* (2013.01); *G07C 2009/00293* (2013.01)

(58) Field of Classification Search
CPC ........... G06K 9/00791; G06K 9/00362; G06K 9/3233
See application file for complete search history.

(56) References Cited

U.S. PATENT DOCUMENTS

| 6,532,360 | B1* | 3/2003 | Shaffer | B60R 25/102 |
| | | | | 455/404.1 |
| 9,747,795 | B1* | 8/2017 | Espinosa | G08B 13/19647 |
| 10,259,427 | B1 | 4/2019 | Kearney | |
| 2006/0250501 | A1* | 11/2006 | Widmann | G08B 13/19647 |
| | | | | 348/148 |
| 2015/0135328 | A1* | 5/2015 | Ellis | G06Q 10/10 |
| | | | | 726/26 |
| 2017/0267170 | A1* | 9/2017 | Be | B60Q 9/00 |
| 2018/0331846 | A1* | 11/2018 | Meakin | H04L 12/2823 |
| 2019/0084525 | A1* | 3/2019 | Ignaczak | G01S 7/022 |
| 2019/0294913 | A1* | 9/2019 | Kim | G06K 9/6202 |
| 2020/0156534 | A1* | 5/2020 | Oikawa | B60Q 1/50 |
| 2020/0367848 | A1* | 11/2020 | Okumura | A61B 6/54 |

* cited by examiner

*Primary Examiner* — Sam Bhattacharya
(74) *Attorney, Agent, or Firm* — Dickinson Wright PLLC

(57) ABSTRACT

A system in a vehicle that includes a camera configured to capture images proximate the vehicle; a GPS transceiver configured to identify a location of the vehicle, and a processor in communication with the camera and the GPS transceiver and programmed to determine the vehicle is proximate to a point of interest (POI) associated with a security mode of the vehicle. The processor is further programmed to, in response to the vehicle proximate to the POI and identifying an occupant of the vehicle outside of the vehicle, send a request to the camera to capture one or more images of an environment proximate the vehicle.

20 Claims, 4 Drawing Sheets

SYSTEM FOR ACTIVATING A SECURITY MODE IN A VEHICLE

TECHNICAL FIELD

The present disclosure relates to vehicle navigation systems and vehicle security.

BACKGROUND

A vehicle may be equipped with one or more components that may be utilized for vehicle security, despite those components not being primarily utilized for security features. For example, vehicle headlights may be utilized as a security feature despite being primarily used for the vehicle's visibility during nighttime driving.

SUMMARY

According to one embodiment, a system in a vehicle includes a camera configured to capture images proximate the vehicle; a GPS transceiver configured to identify a location of the vehicle, and a processor in communication with the camera and the GPS transceiver and programmed to determine the vehicle is proximate to a point of interest (POI) associated with a security mode of the vehicle. The processor is further programmed to, in response to the vehicle proximate to the POI and identifying an occupant of the vehicle outside of the vehicle, send a request to the camera to capture one or more images of an environment proximate the vehicle.

According to another embodiment, a system in a vehicle includes a camera configured to capture images proximate the vehicle; a GPS transceiver configured to identify a location of the vehicle, and a processor in communication with the camera and the GPS transceiver and programmed to determine the vehicle is proximate to a point of interest (POI) associated with a security mode of the vehicle. The processor is further programmed to, in response to the vehicle proximate to the POI and identifying an occupant of the vehicle outside of the vehicle, send a request to the camera to capture one or more images of an environment proximate the vehicle.

According to one embodiment, a system in a vehicle includes a camera configured to capture images proximate the vehicle, a GPS transceiver configured to identify a location of the vehicle, and a processor in communication with the camera and the GPS transceiver and programmed to determine that the vehicle is proximate to a point of interest (POI) associated with a security mode of the vehicle. The processor is further programmed to, in response to the vehicle proximate to the POI and identifying an occupant of the vehicle outside of the vehicle, send a request to the camera to capture one or more images of an environment proximate the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may enter a location that poses potential security risks for an occupant of the vehicle. The vehicle may have multiple systems, subsystems, and components that may be utilized to mitigate security threats for the occupant of the vehicle. Furthermore, the vehicle may assess security risk for the occupant if the occupant is not familiar with the location of the vehicle. The security risks may be assessed based on the time of day, location of the vehicle, category of point of interest (POI) near the vehicle, crime rate of the area, or other factors. The vehicle may activate a security mode if it determines that the occupant may be at risk. The security mode may have multiple levels with varying features. In one embodiment, the highest level of the vehicle's security mode may be utilized to alarm nearby pedestrians, law enforcement, or other contacts.

Figure 1:
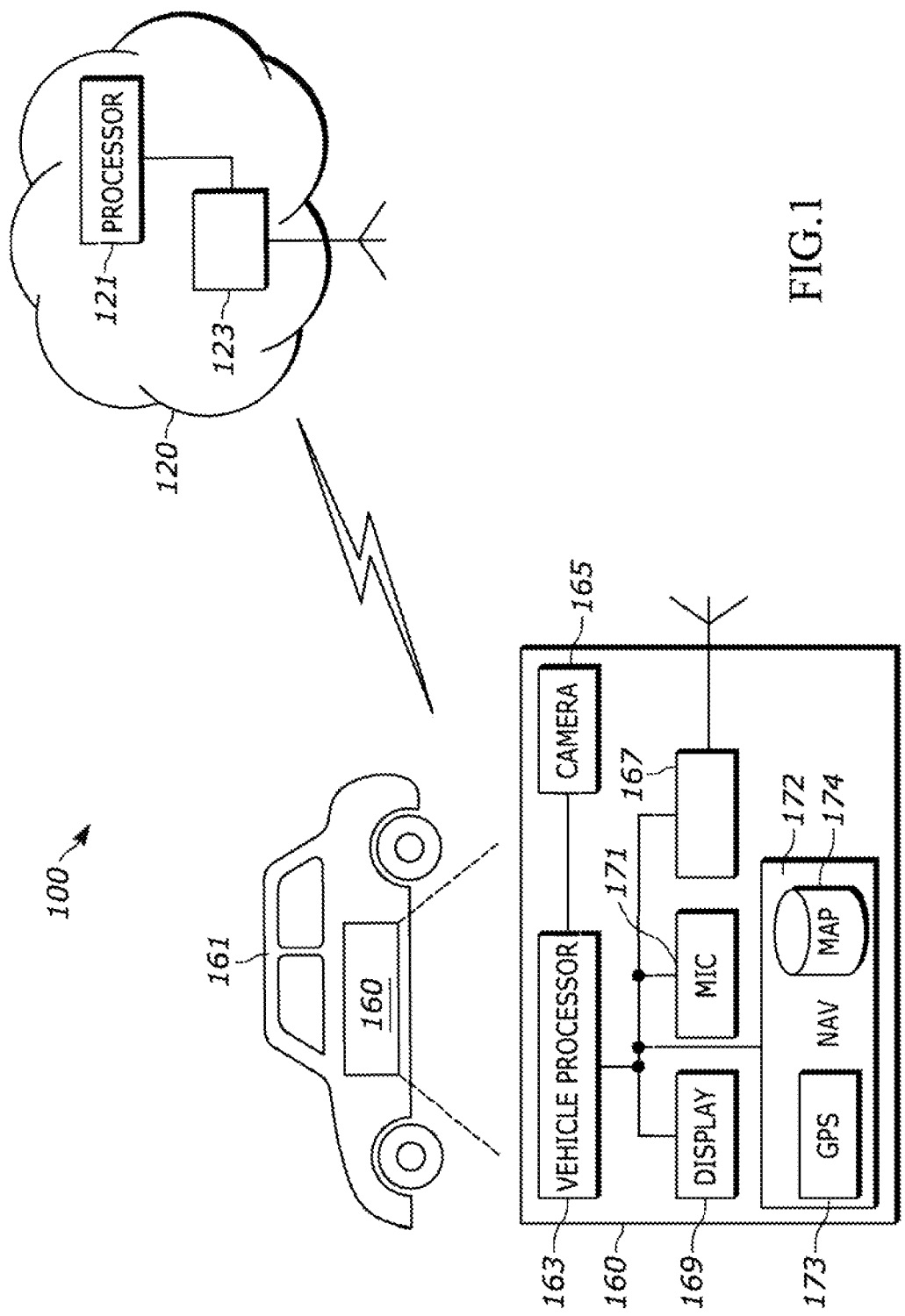
FIG. 1 illustrates a system overview of a vehicle computer system that includes navigation functionality.

As shown in FIG. 1, a system 100 may include a remote server 120 (e.g., cloud) and a vehicle 161. The vehicle 161 may include any type of vehicle, such as a passenger vehicle, a commercial vehicle, motorcycle, sport utility vehicle, minivan, sedan, watercraft, off-road vehicle, etc. The vehicle 161 may be equipped with a transceiver 167 and a global positioning system (GPS) receiver 173 with the vehicle system 160. The GPS receiver 173 may receive signals transmitted from satellites for the GPS. The GPS receiver 173 may also be in communication with a gyroscope and/or a distance sensor. The GPS receiver 173 may detect a position coordinate and an altitude of the present position of the vehicle 161. If a gyroscope is utilized, the gyroscope may output a detection signal corresponding to an angular velocity of a rotational motion applied to the vehicle 161. The distance sensor may output a traveling distance of the vehicle 161. The vehicle 161 may include a vehicle speed sensor to measure the vehicle's speed. In some embodiments, the vehicle 161 may be equipped with a navigation controller that calculates the present position, direction, and velocity of the vehicle 161 based on the output signals from the GPS receiver 173, as well as the gyroscope and the distance sensor. Further, the present position may be calculated in various methods based on the output signal from the GPS receiver 173. For example, a single point positioning method or a relative positioning method may be used to calculate the present position of the vehicle 161. The vehicle 161 may utilize the transceiver 167 to communicate with the remote server 120, which may in turn share data with a mobile device associated with the customer or vehicle 161.

The remote server 120 may include a data center controller 121. The data center controller 121 may include a microcomputer, which has a central processing unit (CPU), a read-only memory (ROM), a random access memory (RAM), an input/output (I/O) interface, and a bus line for coupling the CPU, the ROM, the RAM, and I/O interface. The data center controller 121 may include a communication device 123 (e.g., wireless transceiver, telematics device, stand-alone mobile device, or mobile device paired with a Bluetooth transceiver). The remote server 120 may communicate with the communication device 123 and the vehicle 161 using any wired or wireless communication protocol, including but not limited to Long-Term Evolution (LTE), WiFi, Bluetooth, WiGig, GPS, global navigation satellite system (GNSS), near field communication (NFC), or other telecommunication protocol. In an alternate embodiment, the vehicle 161 may also communicate wirelessly according to a known communication protocol such as, for example, the Dedicated Short Range Communication (DSRC) protocol, Ultra-Wide Band (UWB) protocol, or similar protocol implemented under standards, such as IEEE 802.11p, IEEE 1609, and/or SAE J2735. The remote server 120 may be wirelessly coupled to a network via the communication device 123 to allow for data communication to various devices. The remote server 120 may include more than one data center or server. The communication device 123 of the remote server 120 may perform data communication with a mobile device associated with the vehicle 161. The remote server 120 may include a database that includes data that may be relevant to the vehicle for traffic conditions or other information. For example, the remote server 120 may store real-time weather or traffic information to communicate to a vehicle system 160. Furthermore, the remote server 120 may receive updates and alerts to push to the vehicle 161 based on changing conditions or identification of extreme conditions (e.g., extreme weather conditions, security conditions, or traffic jams). In another embodiment, the remote server 120 may include a concierge or other service that allows an occupant to communicate with an operator (e.g., concierge).

The vehicle 161 may include one or more displays 169 within the vehicle system 160. The display 169 may be a light-emitting diode (LED), liquid crystal display (LCD), organic light-emitting diode (OLED) screen (or other similar screens) with a touch screen display or utilize a haptic device. The display 169 may be located in, for example, an infotainment center of the vehicle 161. The infotainment center may be disposed at the center console of the vehicle 161 and displays menu buttons, such as audio selection, climate control, navigation, and other suitable operable systems available to passengers of the vehicle 161. In yet another example, the display 169 may include a head-up display (HUD) that may project images on a windshield of the vehicle 161. The image projected by the HUD may be information related to, for example, a travel direction, a vehicle speed, and lane markers.

The vehicle 161 may include the vehicle system 160 that includes a vehicle processor 163, camera 165, transceiver 167, microphone 171, and other systems or sub-systems (e.g., navigation system 172). The navigation system 172 may be a portable terminal, such as a smart phone having a navigation function. The vehicle processor 163 may be utilized to send or collect data and other information from the camera 165, transceiver 167, GPS receiver 173, microphone 171, and other vehicle components. The transceiver 167 may be utilized to communicate with the mobile device of driver of the vehicle 161 via the remote server 120 (e.g., cloud) and associated telecommunications network. The transceiver 167 may be a telematics system or mobile device paired with the vehicle system 160 via the transceiver 167 (e.g., Bluetooth transceiver or any wired or wireless transceiver). The microphone 171 may be allowed to receive spoken dialogue commands from a user in one embodiment. The microphone 171 may be configured to receive speech from the driver (e.g., the owner of the vehicle or someone who may utilize the vehicle), or any other person. Additionally, the microphone 171 may allow a third party (e.g., another caller) to communicate with a remote person utilizing the microphone 171. The microphone 171 may be located in an interior cabin of the vehicle 161 (such as a passenger cabin) or may be located in an exterior location of the vehicle 161.

The vehicle system 160 may include a navigation system 172 that may be configured to generate geographic data for the vehicle 161, such as via communicating with one or more satellites orbiting Earth. The geographic data may indicate a current geographic location of the vehicle 161, such as by including current longitude and latitude coordinates of the vehicle 161. As some non-limiting examples, the navigation system 172 may include one or more of a GPS receiver, a Quazi-Zenith Satellite System (QZSS) receiver, a Russian Global Navigation Satellite System (GLONASS) receiver, a Galileo System (GSNN) receiver, an Indian Regional Navigation Satellite System (IRNSS) receiver, and an inertial navigation system (INS) receiver.

The navigation system 172 may communicate the geographic data to the vehicle processor 163, which may be configured to utilize the geographic data to determine the geographic location of the vehicle 161, and to correspondingly determine the geographic location of detected proximate objects. The vehicle 161 may also include a gyroscope or compass configured to indicate a current heading of the vehicle 161 which the vehicle processor 163 may combine with the geographic data to produce data indicating the current location and heading of the vehicle 161. Alternatively, the vehicle processor 163 may determine the heading of the vehicle 161 based on received geographic data indicating a changed position of the vehicle 161 over a short time span (e.g., one second), which suggests that the vehicle 161 is moving in a direction corresponding to the change in position.

The vehicle processor 163 may be configured to query map data 174 based on the geographic data to identify information about the travel infrastructure currently in use by the vehicle 161. In particular, the map data 174 may include detailed information about travel infrastructure in various geographic locations, such as road type (e.g., function class of the road, such as highway, city), road properties (e.g., one way, multi-lane, slope information, curvature information), detailed lane information (e.g., location, dimensions, restrictions such as no passing, turn-only, and traffic direction), and the locations and dimensions of curbs, sidewalks, traffic signals, traffic signs, and crosswalks relative to a road, traffic information, historical traffic information, as some non-limiting examples. Alternatively, the vehicle processor 163 may be configured to derive at least some of this information from proximity data generated by proximity sensors, such as via processing image data captured by camera 165 of the vehicle 161. The map data 174 may also overlay traffic information on a map that is retrieved from remote server 120 or another type of data source.

The navigation system 172 may also include a map database 174 with information regarding one or more point of interests (POI) in a region or area that the vehicle 161 is at or traveling towards. The map database 174 may include information about the name of the POI, category of the POI (e.g., restaurant, bank, parking structure, coffee shop, stadium, hospital, hotel, etc.), phone number, geo-coordinates, etc. The map database 174 may be able to display the POI on a display 169 of the vehicle navigation system 172. In an embodiment explained further below, the vehicle may activate security features at the vehicle based on a category of the POI or a location of the POI. For example, the vehicle may be programmed to trigger security features at a bank, parking structure, ATM, etc.

The vehicle may include a camera 165 that may be an in-vehicle camera mounted in the vehicle 161 to monitor occupants (e.g., a driver or passenger) within the vehicle cabin. The in-vehicle camera may be utilized to capture images of the vehicle cabin. For example, the in-vehicle camera may be utilized to obtain facial information from the driver or occupants or to analyze movements and facial expressions of the occupants. Furthermore, the camera 165 may utilize image recognition to identify a number of passengers in the vehicle. The in-vehicle camera may be a color camera, infrared camera, or time-of-flight camera. The in-vehicle camera may be mounted on a head rest, in the headliner, or located on a mobile device (e.g., tablet or mobile phone).

In one embodiment, the camera 165 may be mounted in a rear-view mirror of the vehicle 161. In other embodiments, the camera 165 may be located anywhere in the vehicle cabin or outside of the vehicle 161, such as the sides of the vehicle cabin or on top of the vehicle cabin. The camera 165 may also be facing out of the vehicle cabin through a windshield of the vehicle 161 to collect imagery data of the environment in front of the vehicle 161. The camera 165 may be utilized to collect information and data regarding the front of the vehicle 161 and for monitoring the conditions ahead and/or around the vehicle 161. The camera 165 may also be used for monitoring the conditions ahead of the vehicle 161 and correctly detecting the positions of lane markers as viewed from the position of the camera 165 and the presence/absence, for example, of lighting of the head lights of oncoming vehicles. For example, the camera 165 may be utilized to generate image data related to the vehicle's surrounding, lane markings ahead, and other types of object detection (e.g., pedestrians, vehicles, cyclists, light posts, parking spots, etc.). The camera 165 may utilize the object detection to identify people or persons that may be approaching the vehicle or an occupant standing outside of the vehicle 161. The vehicle 161 may also be equipped with a rear camera (not shown) for similar circumstances, such as monitoring the vehicle's environment around the rear proximity of the vehicle 161.

The vehicle 161 may be equipped with a security mode feature that may utilize one or more of the components to monitor the occupant or assist the occupant in a threatening situation. The security mode may utilize various vehicle systems and subsystems to monitor an occupant located inside the vehicle or an occupant that has left the vehicle. The security mode may also be utilized to output an alert or notification. The security mode, for example, may utilize various vehicle cameras to collect images or video of the vehicle cabin or environment proximate the vehicle. In one example, a stranger may approach an occupant that is located outside of the vehicle. The cameras may utilize image recognition to identify the stranger approaching the vehicle (or approaching the occupant) and then begin recording surveillance video. In another embodiment, activation of security mode may lock the car doors or car windows, turn on vehicle headlights, dial an emergency operator or emergency contact, etc. The security mode may also be utilized to send data to the remote server or another concierge service when a threat or other suspicious activity is identified. In yet another embodiment, the security mode may activate a notification to be displayed in the vehicle (or on a mobile device of the occupant) to contact an emergency operator or emergency contact.

Figure 2:
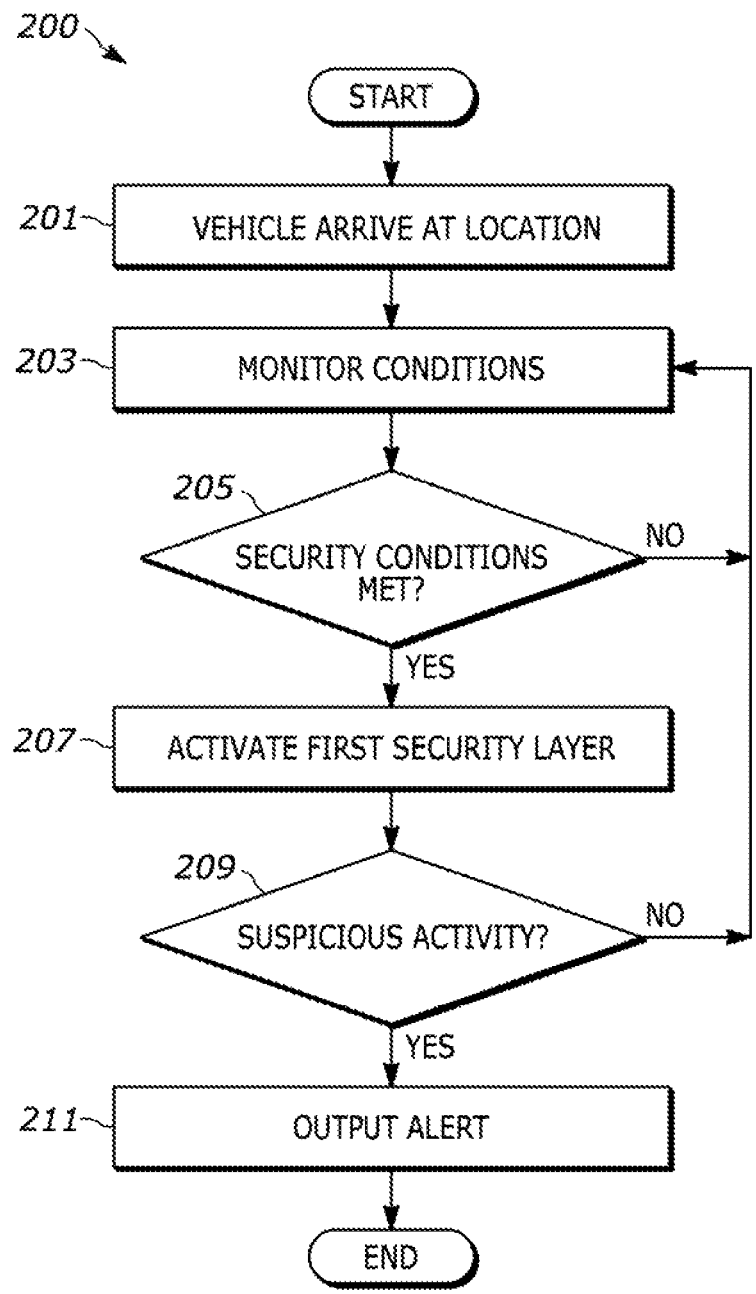
FIG. 2 discloses a flow chart 200 of a vehicle approaching a POI location that may activate a security mode.

FIG. 2 discloses a flow chart 200 of a vehicle approaching a POI location that may activate a security mode. At step 201, the vehicle may determine that it is arrived at a certain location. The vehicle may utilize the GPS coordinates and map database to determine a location of the vehicle. The location may include a specific address of the vehicle's location, a vicinity near a POI that the vehicle is located near, a cross-section of streets, GPS coordinates of the vehicle, etc. The GPS coordinates and map database may be utilized to identify surrounding POIs.

At step 203, the system may monitor vehicle environment conditions. The vehicle may communicate with various systems, subsystems, and components to aggregate data related to the vehicle environment. Such data may include information regarding the time of day, lighting of the area, location or vicinity near a POI, visibility, weather, crime ratings, surrounding infrastructure (walls, pillars, vehicles, etc.), number of surrounding individuals, active content on the screen, drive gear of vehicle (e.g., is the vehicle in park, reverse, drive, etc.), etc. The vehicle processor or controller may then utilize the various data that is communicated and collected to determine if a possible security issue arises. For example, if the data indicates that the vehicle is near a bank, in a high-crime area, and it is late at night, the system may determine that the vehicle may want to activate a security mode to begin recording video of the vehicle's surrounding.

At decision 205, the vehicle may decide whether or not one or more security mode conditions have been met. The security mode conditions may be established to identify a situation that may trigger activation of the security mode. In the circumstance that the conditions have not been met to activate the security mode, the vehicle may simply continue to monitor the vehicle environment conditions by analyzing data aggregated by the sensors. In another embodiment, multiple conditions may be required to be met in order to activate the security mode. For example, the vehicle may look to the time of day and visibility factors (as collected by various vehicle sensors) to determine if the security mode should be activated. Of course, any number of factors may be utilized to determine if the security mode feature should be activated.

At step 207, the system may activate the security mode and related features in a first layer of security. The security mode may be a customized feature as related to the vehicle environment, or it may be a default setting that may be defined by a user. The security mode may thus activate one or more functions as related to the vehicle. In one example, the vehicle system may trigger that the cameras are turned on and monitor for approaching or nearby people (e.g., strangers or body forms). In another examples, the vehicle system may send instructions to lock all the doors or windows in the vehicle. In yet another example, the vehicle may send instructions to turn headlights on if the system determines that the headlights are off and/or the environment is dark near the vehicle.

At decision 209, the system may determine if suspicious activity is around the vehicle. Such suspicious activity may include an approaching person, loitering person, or any person approaching the vehicle or an occupant outside of the vehicle. The vehicle processor or controller may then utilize the various data that is communicated and collected to determine if a possible suspicious activity exists. The vehicle may include image recognition software that is utilized with the cameras that can be utilized to identify familiar faces or unfamiliar faces. In one embodiment, if a familiar face (e.g., utilizing image recognition) is recognized as approaching the occupant, the system may not activate a security mode. However, if the face is unfamiliar and approaching the occupant, the security mode may be activated. The system may also track an unfamiliar faces movement or other image recognition tracking to determine if the passenger is moving towards a door of the vehicle or an occupant located outside the vehicle.

At step 211, the system may activate one or more alerts in addition to the first layer of security. For example, the first layer of the security mode may include activation of vehicle cameras to record video or take images of the vehicle's environment. At another threshold (e.g., second threshold), one or more alerts may be activated at the security mode in addition to the monitoring (e.g., image recording). In addition, the vehicle may communicate with a mobile device associated with the occupant to trigger various alerts. The vehicle may be programmed to trigger either a single alert, a combination of alerts, or series of alerts. In one example, the alert may include flashing lights (e.g., vehicle headlights or vehicle cabin). Other examples of alerts may include turning on the vehicle lights, voice recognition alert, rolling up windows or locking the windows, automatically closing or locking doors, pinging a concierge service to notify the concierge of the incident, or sending a message (e.g., text message) or dialing an emergency operator or contact.

Figure 3:
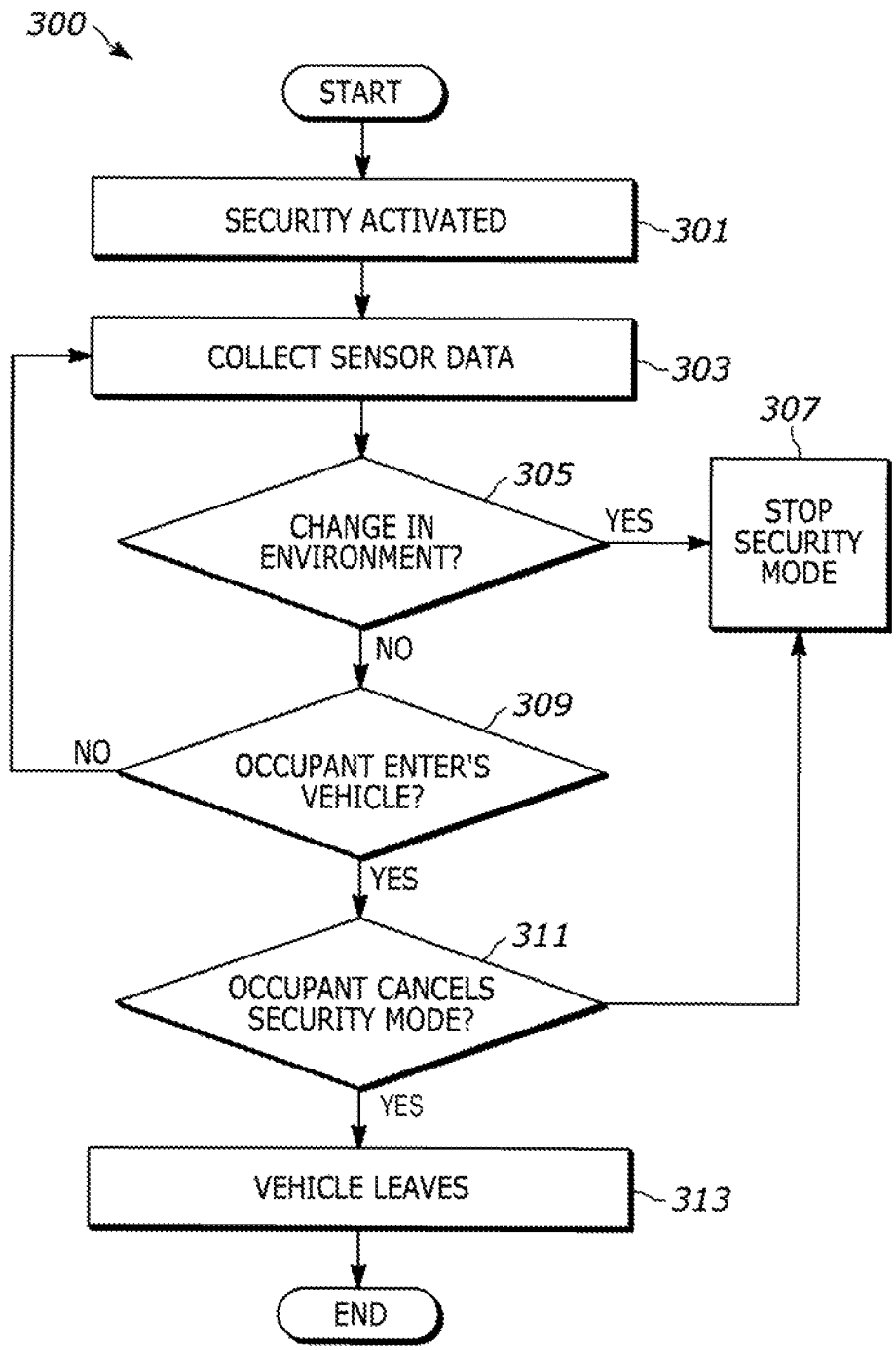
FIG. 3 discloses a flow chart 300 of a vehicle approaching a POI location that may deactivate a security mode that has been summoned.

FIG. 3 discloses a flow chart 300 of a vehicle approaching a POI location that may deactivate a security mode that has been summoned. As explained further below, the deactivation may occur based on changes in the vehicle environment, the vehicle leaving a specified area, action by the occupant, etc. At step 301, the system may determine that the security mode has been activated. As disclosed above, the security mode may have been activated automatically based on the sensor data, or manually activated based on input from the occupant (e.g., door lock, input on vehicle display, alarm trigger, etc.). The security mode may monitor the vehicle surroundings and in particular the occupants of the vehicle.

At step 303, the system may continue to monitor the sensor data around the vehicle environment. The vehicle may communicate with various systems, subsystems, and components to aggregate data related to the vehicle environment. Such data may include information regarding the time of day, lighting of the area, location or vicinity near a POI, visibility, weather, crime ratings, surrounding infrastructure (walls, pillars, vehicles, etc.), number of surrounding individuals, active content on the screen, drive gear of vehicle (e.g., is the vehicle in park, reverse, drive, etc.), etc. The vehicle processor or controller may then utilize the various data that is communicated and collected to continue to monitor possible security issues. For example, if the data indicates that the vehicle is at a parking garage and it is late at night with low visibility in the vehicle's area, the system may have activated a security mode to record video of the vehicle's surrounding. The system may continue to monitor data to determine whether to continue a security mode or to cancel the security mode.

At step 305, the system may determine if a change in the environment has occurred that may trigger cancelation of the security mode. For example, the data may initially determine that a security mode should be activated at a bank because of low visibility (or another factor), however, if visibility changes (e.g., due to a streetlight), it may stop the security mode at step 307. Thus, the system may cancel the security mode if a change in the vehicle environment has ceased need for security. The system may monitor various sensors and data collected from those sensors to identify any changes at the vehicle to warrant cancelation of the security mode. However, if the environment still warrants the security mode to be activated, the system may further monitor the vehicle and the occupant's activity.

At decision 309, the system may determine if the occupant has entered the vehicle. The vehicle may utilize communication signals that activate when a door opens and/or closes to determine that someone may have entered the vehicle. In addition, the vehicle may include sensors, such as a seat sensor or in-vehicle cameras to identify occupants. The vehicle may also utilize other biometric sensors to identify an occupant entering the vehicle. In yet another embodiment, the vehicle may determine that the occupant has started the vehicle (e.g., ignition on cycle or engine on cycle) and thus an occupant is in the vehicle. Upon having the occupant enter the vehicle, the vehicle may continue to activate the security mode and display a pop-up notification indicating an option to cancel the security mode.

At decision 311, the system may determine if the occupant canceled the security mode manually. The security mode may be cancelled manually through a user interface in one scenario. The user interface may include a notification message that includes a message that the security mode was activated. The notification message may also include an input option (e.g., a button the display) to cancel the security mode activation. In another embodiment, the occupant may be able to cancel the security mode utilizing voice input. In one example, the occupant may cancel an alarm or alert that dials an emergency operator. The vehicle may nonetheless still ping a remote server (e.g., remote concierge service) and have an agent speak with the occupant to ensure the occupant is safe. A text message may also be automatically sent to an emergency contact, such as a spouse.

At step 313, the system may determine that the vehicle has left the location where the security mode was activated. The vehicle may monitor vehicle speed signals, GPS coordinates, and other data to determine that the vehicle has begun moving and leaving the area of activation for the security mode. Furthermore, the vehicle may monitor the surroundings and vehicle cabin for the presence of people outside of the vehicle or in the vehicle cabin by utilizing the cameras and image recognition. The system may deactivate the security mode if the collected data indicates that the threat presence is low, or the vehicle has left the associated POI that activates the security mode. In yet another embodiment, rather than deactivate the security mode, the vehicle may reduce a level of activation of the security mode, but still have the security mode activated. For example, the vehicle may deactivate any audible alerts that are triggered but may utilize vehicle cameras to continue to record images of the vehicle's surrounding.

Figure 4:
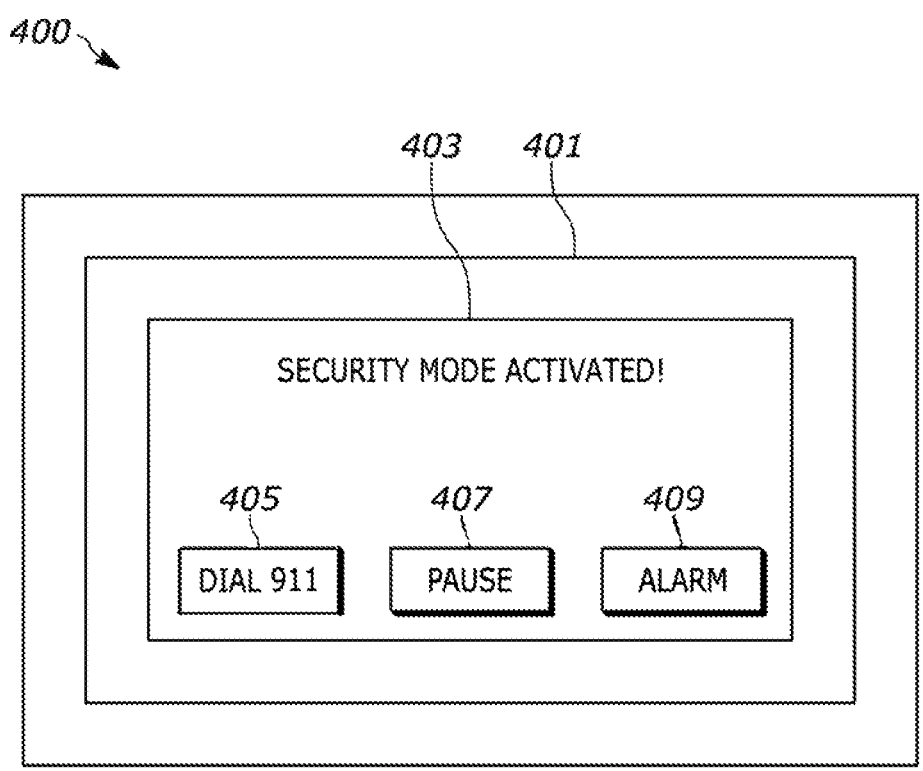
FIG. 4 is an embodiment of an exemplary screen including a notification that is related to activation of the security mode.

FIG. 4 is an embodiment of an exemplary screen 400 that may output a notification that is related to activation of the security mode. The display 401 may be any display in the vehicle, including an instrument panel display, navigation display, multimedia display, mobile phone display, etc. In an exemplary embodiment, the display may include a message 403 indicating the cause of the security notification. For example, the security notification 403 may state language indicating that visibility is low at a bank (or another POI) causing activation of a security mode. In another embodiment, the security notification may output language indicating that it is late at night at a parking garage in a high-crime area, so the security mode has been activated. The notification may also include a first button 405 (or any other input) that will automatically dial an emergency operator (e.g., 911) or emergency contact. The notification may also include a second button 407 (or any other input) to cease the security mode. Activation of the second button 407 may thus cancel or pause the security mode. The notification may also include a third button 409 that will trigger an alarm (or another alert), and at the vehicle. Activation of the third button 409 may thus trigger the vehicle alarm, flash vehicle lights (e.g., head lights or cabin lights), or lock vehicle doors, close windows, etc.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system in a vehicle, comprising:
    a camera configured to capture images proximate the vehicle;
    a global position system (GPS) transceiver configured to identify a location of the vehicle;
    a processor m communication with the camera and the GPS transceiver and programmed to:
    determine the vehicle is proximate to a point of interest (POI) associated with a security mode of the vehicle, wherein the POI is associated to a navigation database; and
    in response to the vehicle proximate to the POI and identifying an occupant of the vehicle outside of the vehicle, send a request to the camera to capture one or more images of an environment proximate the vehicle.

2. The system of claim 1, wherein the processor is further programed to, in response to the images proximate the vehicle, detect one or more persons proximate the vehicle; and
    output an audible notification indicating detection of the one or more persons proximate the vehicle.

3. The system of claim 1, wherein the system further includes one or more sensors to identify a time of day and the processor is further programmed to send instructions to activate vehicle lighting in response to the time of day.

4. The system of claim 1, wherein the processor is further programmed to send instructions to activate a door lock function in response to the vehicle proximate to the POI.

5. The system of claim 1, wherein the processor is further programmed to output on a display a notification that includes an input to dial an emergency operator.

6. The system of claim 1, wherein the processor is further programed to, detect one or more persons proximate the vehicle utilizing the images proximate the vehicle; and
    output an audible notification indicating detection of the one or more persons proximate the vehicle.

7. The system of claim 6, wherein the processor is further programmed to dial an emergency operator.

8. The system of claim 6, wherein the audible notification includes a distance between the one or more persons and the occupant of the vehicle outside the vehicle.

9. The system of claim 6, wherein the processor is further programmed to dial one or more emergency contacts.

10. The system of claim 6, wherein the processor is further programmed to send a message to one or more emergency contacts.

11. The system of claim 6, wherein the processor is further programmed to output the audible notification in response to crime rate data associated with the location of the vehicle.

12. A system in a vehicle, comprising:
    a global position system (GPS) transceiver configured to identify a location of the vehicle;
    a processor m communication with a camera and the GPS transceiver and programmed to:
    determine the vehicle is proximate to a point of interest (POI) associated with a security mode of the vehicle, wherein the POI is associated to a navigation database; and
    in response to the vehicle proximate to the POI and identifying an occupant of the vehicle out of the vehicle utilizing images from the camera, activate the security mode that sends a request to the camera to capture one or more images of an environment proximate the vehicle.

13. The system of claim 12, wherein the processor is further programmed to, in response to identifying one or more persons proximate the vehicle, sending instructions to flash one or more vehicle lights.

14. The system of claim 12, wherein the processor is further programmed to, in response to identifying one or more persons proximate the vehicle, sending instructions to lock one or more vehicle doors.

15. The system of claim 12, wherein the processor is further programmed to, in response to identifying one or more persons proximate the vehicle and a window of the vehicle open, sending instructions to close the window of the vehicle.

16. A system in a vehicle, comprising:
    a camera configured to capture images proximate the vehicle;
    a global position system (GPS) transceiver configured to identify a location of the vehicle;
    a display;
    a processor in communication with the camera, the GPS transceiver, and the display and programmed to:

determine the vehicle is proximate to a point of interest (POI) associated with a security mode of the vehicle, wherein the POI is associated to a navigation database; and in response to the vehicle proximate to the POI and identifying an occupant of the vehicle outside of the vehicle, activate the security mode that sends a request to the camera to capture one or more images of an environment proximate the vehicle; and in response to detecting one or more persons approaching the occupant of the vehicle out of the vehicle based upon the one or more images of the environment proximate the vehicle, output a notification on the display to dial an emergency contact.

17. The system of claim 16, wherein the processor is further programmed to, in response to detecting one or more persons approaching the occupant based upon the one or more images of the environment proximate the vehicle, send instructions to activate one or more audible notifications at the vehicle.

18. The system of claim 16, wherein the processor is further programmed to, in response to detecting one or more persons approaching the occupant based upon the one or more images of the environment proximate the vehicle, send instructions to activate headlights of the vehicle.

19. The system of claim 16, wherein the processor is further programmed to dial the emergency contact in response to an input associated with the notification.

20. The system of claim 19, wherein the notification is a pop-up notification and the input is a touch input at the display.

* * * * *